J. GATES.

LUBRICATOR.

No. 7,661. Reissued May 8, 1877.

Witnesses;
Harry C. Clark
Mamie Stallings.

Inventor
John Gates.
By H. W. Beadle Jr.
Attys.

N. PETERS, Photo-Lithographer, Washington, D. C.

UNITED STATES PATENT OFFICE

JOHN GATES, OF PORTLAND, OREGON.

IMPROVEMENT IN LUBRICATORS.

Specification forming part of Letters Patent No. 107,478, dated September 20, 1870; Reissue No. 7,661, dated May 8, 1877; application filed August 26, 1876.

DIVISION A.

*To all whom it may concern:*

Be it known that I, JOHN GATES, of Portland, in the county of Multnomah and State of Oregon, have invented a new and useful Improvement in Methods of and Apparatus for Feeding Oil for Lubricating Purposes; and I do hereby declare that the following is a full and exact description of the same, reference being had to the accompanying drawings, and to the letters of reference marked thereon.

This invention is designed for feeding oil for lubricating purposes; and it consists, mainly, first, in an improved method of feeding, consisting, essentially, in employing a water-column extending above the body of oil, causing the same, by hydrostatic pressure, to expel the oil to the part to be lubricated and controlling the movement of the column, so that feeding will occur only at proper times or as may be desired; and, second, in certain means for carrying the method practically into effect, consisting, essentially, of an elevated water-pipe having a regulating-cock controlling its discharge-opening, an oil-reservoir, and a discharge-pipe leading to the parts to be lubricated.

Figure 1:
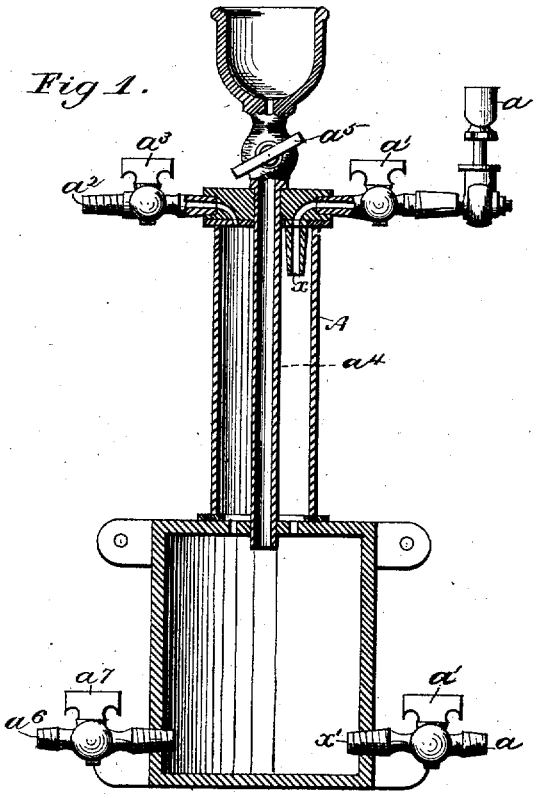
Figure 2:
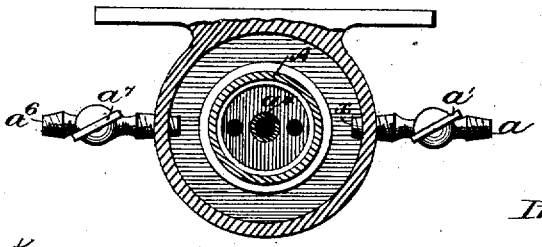

In the drawings, Figure 1 represents a central sectional elevation of the improved lubricator, by means of which my method is carried practically into effect; and Fig. 2, a horizontal section of the same taken on the line *x x*, Fig. 1.

To enable others skilled in the art to understand my method, and to make and use my improved lubricator for carrying it practically into effect, I will proceed to describe them both.

In the drawings, A represents an oil-reservoir of any proper construction.

*a* represents an induction-pipe, communicating with any water-supply sufficiently elevated to furnish a column of water capable of raising and delivering the oil to the part to be lubricated. If desired, this pipe may discharge either into the top of the reservoir, as shown at *x*, or into the bottom, as shown at *x'*, or at both points, as shown.

*a'* represents a regulating-cock, by means of which the inflow of water from pipe *a* is controlled.

$a^2$ represents an oil-eduction pipe, leading to the part to be lubricated.

$a^2$ represents a cock, which may be employed, if desired, to control the discharge.

$a^4$ represents a pipe, having a cock, $a^5$, by means of which the reservoir may be filled with oil.

$a^6$ represents a waste-pipe, having a cock, $a^7$, by means of which the oil-reservoir may be emptied whenever it becomes filled with water.

The method of operating will be readily understood. The reservoir having been properly supplied with oil, the same may be discharged in proper quantities through the oil-eduction pipe by opening the cock *a'*, in consequence of which the pressure of the water-column is brought to bear upon the oil, and the same, of course, is expelled to the part to be lubricated.

The amount of oil discharged at any time will equal, of course, the amount of water admitted, so that a greater or less amount may be used by properly regulating the cock *a'*, according to the circumstances of the case.

Having thus fully described my invention, what I claim as new, and desire to secure by Letters Patent, is—

1. The method herein described of feeding oil for lubricating purposes, consisting, essentially, in employing a water-column extending above the body of the oil, causing the same, by hydrostatic pressure, to expel the oil to the part to be lubricated, and controlling the movement of the column, substantially as and for the purposes set forth.

2. In a lubricator, the combination of the following elements: an elevated water-pipe having a regulating-cock controlling its discharge-opening, an oil-reservoir, and a discharge-pipe leading to the part to be lubricated, substantially as and for the purpose set forth.

This specification signed and witnessed this 10th day of August, 1876.

JOHN GATES.

In presence of—
JOSEPH SIMON,
C. A. DOLPH.